United States Patent [19]

Scholten et al.

[11] 4,322,299

[45] Mar. 30, 1982

[54] METHOD OF SIMULTANEOUS AIR-WATER WASH OF MULTIPLE-MEDIA FILTERS

[75] Inventors: John J. Scholten; James C. Young, both of Ames, Iowa

[73] Assignee: General Filter Company, Ames, Iowa

[21] Appl. No.: 179,050

[22] Filed: Aug. 18, 1980

[51] Int. Cl.³ .............................................. B01D 23/24
[52] U.S. Cl. ................................. 210/794; 210/290
[58] Field of Search .............................. 210/793–795, 210/807, 263, 274, 275, 290, 792; 134/25.1, 30

[56] References Cited

U.S. PATENT DOCUMENTS

| | | | |
|---|---|---|---|
| 293,745 | 2/1884 | Hyatt | 210/290 |
| 3,343,680 | 9/1967 | Rice et al. | 210/263 |
| 3,698,554 | 10/1972 | Mail | 210/794 |
| 4,076,625 | 2/1978 | Scholten et al. | 210/275 |

Primary Examiner—Ivars C. Cintins

[57] ABSTRACT

A method is described in which two or more granular filter media are used in combination in such a manner that the filter bed is backwashed using air and water simultaneously. The media size gradation and density are selected so that, although the media may be mixed during backwash, the media are separated into layers according to their density and/or size following termination of the simultaneous air-water wash and prior to returning the filter to the filtration mode. The simultaneous air-water wash step can be carried out without media loss by use of an appropriate media retaining procedure.

12 Claims, 6 Drawing Figures

(FILTERING)

(BACKWASHING)

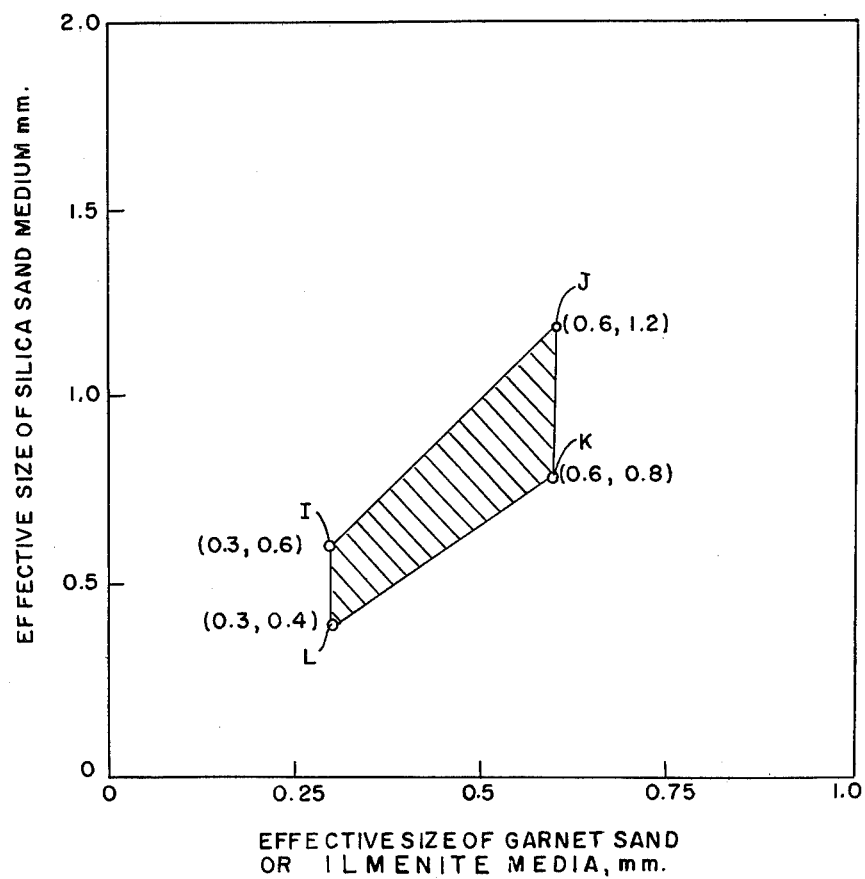

METHOD OF SIMULTANEOUS AIR-WATER WASH OF MULTIPLE-MEDIA FILTERS

BACKGROUND AND COMMERCIAL PRIOR ART

The conventional method of backwashing or cleaning granular media filters, as commonly used for removing suspended solids from waters or wastewaters, is to pass water upward through the bed at sufficiently high velocities that the media are first fluidized, that is, the media grains are suspended or floated in the upward flowing backwash water, and secondly, expanded by as much as 50% over the settled bed height so that particles of entrapped solids can be removed from between the media grains. After a backwash operation of this type, a single-medium filter bed is left stratified so that the smaller grains are in the upper part of the bed and the larger grains are in the lower part of the bed. When multiple-media filters—usually consisting of coal over sand, or coal over sand over garnet—are used, the sizes of the media are selected so that the lower density and usually larger grain size media overlie the higher density and usually smaller grain size media.

When using multiple-media filter beds, a zone of intermixed media may occur in which the small sizes of the higher density media are interspersed with the larger sized grains of the lower density media. The extent of intermixing depends on the relative size and density of the media within each layer and may be controlled to some extent by appropriate selection of size and gradation of each medium and by the rate and duration of backwash.

Conventional filter designs range from those having essentially no intermixing to those having intermixing through most of the bed depth. Filters having as many as four distinct layers distinguished by media type and grain size or both have been used in full-scale water and waste-water filtration plants. The amount of intermixing is, to a large extent, a filter design option.

Conventional fluidization and expansion backwash methods are not always as effective as desired. The ineffectiveness of scouring of solids with water alone is well known, and is the reason for development of auxiliary media scouring techniques such as air wash preceding water wash and media scouring with high velocity jets of water prior to and during water wash. Even these methods are not as effective as desirable and examples of dirty media and "mudballs" remaining after backwashing by such techniques also are well known.

An alternate backwash method is to use air and water simultaneously throughout much of the backwash cycle. Both research tests and field experience have shown this method to be much more effective in cleaning filter media than conventional backwash methods. Prior to the method described by this invention, the simultaneous use of air and water at the same time water is flowing from the backwash collector has been restricted in practice to single-medium beds that did not require stratification or separation into two or more layers of different sizes or types of media. The simultaneous use of air and water for durations longer than required to fill the volume between the lowest water level prevailing at the end of the filtration sequence and the overflow weir of the backwash collector will result in loss of significant amounts of media unless some positive means is used to control media loss.

When simultaneous air-water wash has been used with multiple-media filters, its use has been restricted to a very short period during which water rises from a level slightly above the surface of the media to the edge of the waste backwash water collector. The air flow must then be terminated to prevent media loss, and the water wash is continued, usually at an increased rate, to wash entrapped solids from the bed and to separate the media into respective layers of different size or density. Using conventional media grain-size and density combinations requires that a relatively high rate water-only step follow the air wash or hydraulic scouring to fluidize and expand these media so that solids washout and stratification occur. For example, a dual-media mixture of 1.0 mm effective size (E.S.) coal over 0.5 mm E.S. silica sand can be backwashed using water at a rate as low as 8 gallons per minute per square foot (gpm/sq.ft.) simultaneously with air at rates as low as 2 standard cu.ft. per minute per square foot (scfm/sq/ft.), whereas washout of solids from these two media and subsequent restratification using water alone, as used in conventional backwash methods, require water rates as high as 20 gpm/sq.ft.; and when using larger grain size combinations, even higher rates of water become necessary. However, it is desirable to be able to use a simultaneous air-water wash method with multiple-media filters that can be extended for a longer backwash duration than the rise time from slightly above the surface of the media to the edge of the waste backwash water collector without the loss of media and subsequently will restratify the filter bed in a manner suitable for filtration.

PATENT PRIOR ART

A number of multiple-media filters and systems of filtration and backwashing have been patented. Rice et al U.S. Pat. No. 3,343,680 discloses a three-media filter wherein particles of all three media are intermixed. The filter is said to be designed so that in filtration use the number of particles per unit area continually increase in the direction of water flow through the bed. In preparing the filter, it is disclosed that the initially stratified layers of the beds are placed in the filter, and then "backwashing the bed until the particle distribution has reached a substantially constant orientation" (col. 2, lines 37-40). Only backwashing with water alone is described. It is stated that thereafter both filtration and backwashing can be carried out without substantially changing the particle distribution.

Hsiung et al in U.S. Pat. No. 3,876,546 disclose an extension four-media bed of the Rice et al filter bed. As with the Rice et al bed, the particles of the different media of the bed are said to be intermixed so that there is a continually increasing number of particles per unit area in the direction of water flow through the bed during filtration. The bed is backwashed with water at a rate sufficient to adequately fluidize the bed, the backwashing being with water only except that air scouring or hydraulic scouring may precede water wash.

Multiple-media beds have been proposed which are designed to avoid or minimize intermixing of the stratified layers of the different media. Hirsch U.S. Pat. No. 3,497,068 discloses a multiple-media bed in which the different media possess equal hydraulic uplift properties when subjected to backwashing. Presumably, therefore, each layer of the bed expands to permit removal of the entrapped solids without intermixing of the layers, thereby permitting the layers to settle back to their original stratified condition after backwashing is concluded. The backwashing is by water alone.

Hirs U.S. Pat. No. 3,925,202 discloses a dual-media filter bed where the layers are partially intermixed. The recommended method of backwashing is to first scour the bed with air, and then to use a water wash without air. An alternate method is mentioned in which air is introduced simultaneously with the backwash water (col. 4, lines 28-36), but this method was not related to media size, combination, preferred backwash rate, or desired media separation.

The problem of reverse stratification during backwashing is discussed in Hirs U.S. Pat. No. 4,048,068. Bed designs and a multiple-tank filter system are disclosed for avoiding such reverse stratification, which may require regrading of the beds to a more stratified condition before filtration can be continued. Another system for avoiding the necessity of regrading layers of a multiple-media bed is described in Hirs U.S. Pat. No. 3,814,247.

Simultaneous air-water backwashing of single-media filters has been proposed including the desirability of equipping such filters with baffled backwash troughs to reduce media loss. See Scholten et al U.S. Pat. No. 4,076,625 and Row et al U.S. Pat. No. 2,453,345. Neither of these patents suggests how such filters can be used with multiple-media beds.

SUMMARY OF THE INVENTION

The backwash method of this invention is applicable to the use of two or more layers of media differentiated in size or density or both and backwashed in such a manner that the bed is substantially mixed during backwash by simultaneously passing air and water through the bed. The duration of this backwash operation is extended sufficiently that the air and water flow simultaneously while waste backwash water passes over the weir of the backwash collector. After the air application is discontinued, at a time determined by cleanliness of the backwash water or by the duration of backwash or by other appropriate means, the flow of water is continued to separate the media into respective layers distinguished by size and density or both. By properly selecting the backwash rate and the grain size and density of each individual medium, various types and sizes of media can be substantially separated without increasing the water rate above that used during simultaneous air-water wash. For example, a filter bed consisting of 1.0 mm E.S. anthracite coal having a specific gravity of about 1.7 (weight relative to equal volume of water) over 0.5 mm E.S. garnet sand or other granular material having a specific gravity greater than 2.60 can be washed effectively when using water at 10 to 12 gpm/sq.ft. simultaneously with air at 2 to 3 scfm/sq.ft. and then can be stratified effectively without having to increase the backwash water rate. This same filter media combination, when backwashed by conventional methods, typically requires about 20 gpm/sq.ft. to expand the bed during backwash sufficiently to remove entrapped solids and to separate the media into its respective layers. Although the backwash water rate used in the method of the present invention can be held substantially constant throughout the entire backwash operation, and this is a preferable procedure, the method of backwashing of this invention can also be used with a low rate of water during simultaneous air-water wash, which is followed by a higher rate of water alone to separate the media after the air flow is terminated.

The method can also be used for backwashing filter bed combinations having media sizes and densities other than those referred to above, providing the backwash air and water rates are adjusted to those appropriate for the different combination.

Features of the present invention include:

(1) providing a method of backwashing granular-media filters comprised of two or more media sizes or densities or both by using air and water simultaneously while waste backwash water is passing into a backwash water collector;

(2) controlling media loss during simultaneous air-water wash of multiple-media filters by using a system of baffles surrounding the backwash collector or other suitable means to separate the air from the waste backwash water preceding its exit over the backwash water collector; and (3) providing a method of washing multiple-media filters with the simultaneous use of air and water but without requiring an increase in the backwash water rate to separate the media into size or density layers after the air flow is terminated.

The improvements in backwashing achieved by the method of this invention provide an increased ability to scour entrapped solids from the surface of the media grains of multiple-media filters and from the interstitial spaces between grains. Further, these solids can be removed effectively at lower backwash rates than used in conventional backwash techniques. The method also permits effective cleaning of multiple-media filter beds containing larger grain sizes than are used in conventional filter designs. This feature permits significant increase in run time between backwashing and produces savings in filter operating costs and costs for treatment of waste backwash water. Conventional multiple-media filters usually are restricted to the use of media that will expand 20 to 50% at backwash rates of 15 to 20 gpm/sq.ft. This means that the use of anthracite coal media having a specific gravity of 1.6 to 1.7 is limited to effective sizes of about 1.0 mm; silica sand (S.G.=2.6 to 2.7) effective sizes are limited to about 0.6 mm; and garnet (S.G. about 4.1) or ilmenite (S.G. about 4.6) sizes are limited to about 0.3 mm E.S. Larger sizes of these media are commercially available but when used in multiple-media filters, require such high backwash rates as to be impractical. For example, the use of 1.5 mm coal over 0.8 mm sand requires about 30 gpm/sq.ft. backwash rate to expand the bed 20 to 30%, and although the use of such rates is possible, the size of physical appurtenances such as valves, piping, pumps, etc. cause filter operating costs to increase appreciably.

BRIEF DESCRIPTION OF THE DRAWINGS

The accompanying drawings and diagrams are illustrative of preferred embodiments of the method of this invention.

FIG. 5 is a diagram illustrating the preferred size relation between a silica sand medium and garnet sand or ilmenite medium for use as adjacent layers in multiple-media beds.

DESCRIPTION OF PREFERRED EMBODIMENTS

Figure 1:
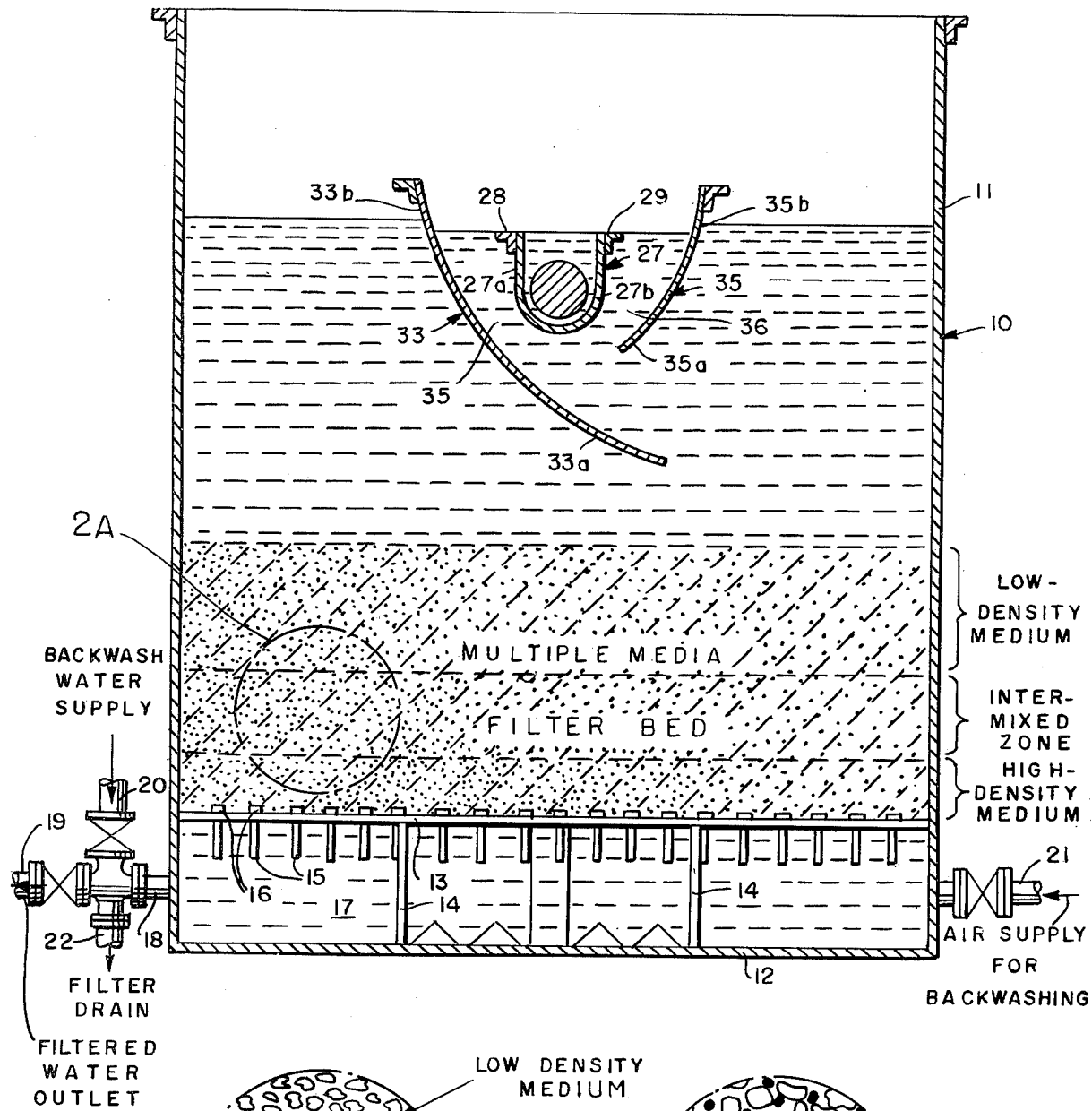
FIG. 1 is an elevational sectional view of a water filtration apparatus, including a baffle and wash trough assembly in the upper portion thereof, and a multiple-media filter bed in the lower position.

Looking first at FIG. 1 there is shown a vertically extending tank 10, which as shown is formed of metal (viz. steel), but it can be constructed of other materials, such as concrete. It will also be understood that although the tank, as shown, is circular in horizontal cross-section, other shapes may be used.

The tank 10 has an open top, circular side walls 11, and a closed bottom 12. It also will be understood that enclosed tanks for filtration under pressure may be used. Spaced upwardly from bottom 12 there is provided an underdrain plate 13, supported by bracing 14 and connected to the tank sides 11 by means to form a watertight seal therebetween. Extending through plate 13 are a plurality of nozzle tubes 15 having strainer caps 16 on the top thereof above plate 13. During downflow filtration the water passes downwardly through the strainers 16 and the nozzles 15 into the underdrain chamber 17 and is removed through pipe connection 18 to the filtered water outlet pipe 19. The same arrangement can be used for upflow filtration the water to be filtered entering chamber 17, which now serves as a water introduction chamber, rather than as an underdrain chamber, the water then passing upwardly through the nozzle tubes 15 and the stainer cap 16.

During washing, water is supplied under pressure through pipe 20 to pipe 18 and chamber 17 for passing upwardly through nozzle tubes 15 and strainers 16. Also during washing, air is supplied under pressure through pipe 21 which connects with underdrain chamber 17. Air enters the nozzles through holes in the upper portions thereof, while water enters through the lower ends of the nozzle tubes. Further details of this filtration apparatus are described in Scholten and Young U.S. Pat. No. 4,076,625. Similar apparatus is available commercially from General Filter Company, Ames, Iowa. Alternate means of adding the air to the filter can be used, for example, as through a distribution grid placed within or immediately below the filter media bed. The pipes 19, 20 and 21 are usually provided with separate shut-off valves as is drainpipe 22.

A multiple-media filter bed is provided above plate 13. Where the fine granular material, such as sand, extends to the drain plate 13, the nozzles 15 may be equipped with strainer caps 16 having a series of narrow annular slots through which the water flows while retaining the granular medium above plate 13. (See U.S. Pat. No. 4,076,625) The filter medium comprising the multiple-media bed will contain two or more different filtering materials, such as granular materials of different average size, different denisty, etc.

For example, the multiple-media bed may comprise a two-media, three-media, or four-media bed, the media being selected in accordance with media previously used for such multiple-media beds. Two or more layers of media will be provided which are differentiated in size or density or both. Commonly, there will be a distinct upper layer of a medium of lower density and larger effective size and at least one distinct layer of a medium of higher density and smaller effective size. For example, in a two-media bed, the upper layer may be comprised of coal particles and the lower layer particles of silica sand. Alternatively, in a two-media bed, the upper layer may be comprised of coal particles, and the lower layer of either garnet or ilmenite sand. As a further example, in a three-media bed, the uppermost layer may be comprised of coal particles, the intermediate layer particles of silica sand, and the lower layer particles of garnet or ilmenite sand. For other useable multiple-media beds, reference may be had to the media disclosed in the U.S. Pat. Nos. 3,343,680 and 3,876,546.

Returning to FIG. 1, the wash trough and baffle assembly used for preventing media loss during simultaneous air and water backwash will now be described. A wash water collection trough 27 is supported to extend horizontally across the upper portion of tank 10. Trough 27 has an upper edge on at least one side thereof functioning as an overflow weir. As shown in FIG. 1, trough 27 provides overflow weirs on both sides thereof, being respectively designated by the numbers 28 and 29. Trough 27 as shown in FIG. 1 can vary in design and construction detail without affecting its function.

Baffles 33 and 35 are supported adjacent to both sides of the trough in spaced relation to the trough and extending horizontally along the weir edge 28. Baffle 33, referred to as the long baffle lies adjacent to side 27a of trough 27 and includes a portion 33a extending below the trough bottom 30 and a portion 33b extending to a level above weir edge 28, thereby defining a restricted flow channel 35 for the passage of backwash water into trough 27. Baffle 35, referred to herein as the short baffle, is supported adjacent the other side of the trough (side 27b) and extends horizontally along weir edge 29. Baffle 35 also includes a portion 35b extending to a level above weir edge 29, thereby defining a second restricted flow channel 36 for the passage of backwash water into the trough 27. The lower end of portion 35a of baffle 35 terminates above and is spaced from the lower end portion 33a of the long baffle 33. For further details, reference may be had to U.S. Pat. No. 4,076,625.

It will be understood that the above detailed physical description of a granular medium filter and its appurtenances such as the backwash water collection trough and air-water separator baffles are given here to aid in the description of the backwash method of the invention and that tank size and configuration and trough and baffle assembly designs can vary without affecting the purpose and execution of the subject backwash method.

With the foregoing background, the multiple-media washing method of the present invention can be understood. It is carried out in a filter including a tank having a stratified multiple-media bed therein including a distinct upper layer of a medium of lower density (and preferably also a larger effective particle size) and at least one distinct lower layer of a medium of higher density (and preferably also smaller effective particle size). An upflow air-water wash means is provided which permits simultaneous washing of the bed with a mixture of air and water followed by washing with water alone, and there is provided water withdrawal means in the upper portion of the tank above the bed including means for diverting media suspended in the wash water from exiting therewith. As the first step of the washing method, there is passed a wash mixture of air and water upwardly through the bed at combined air and water flow rates sufficient to cause partial intermixing of the distinct layers. The combined air-water backwash flow is continued while simultaneously removing water from the tank through the wash water withdrawal means in the upper portion of the tank. Advantageously, from 25 to 75% or more of the water used for the wash cycle can be passed through the bed and exit through the water withdrawal means during the simultaneous air-water wash. The combined air-water wash is then interrupted. For example, the air flow is discontinued while the water flow is continued to complete the washing and to obtain restratification of the layers. The water flow may be continued at the same rate as in the combined air-water washing, or at a higher rate if required to obtain the desired regrading of the layers. In either case, the water rate should be sufficient to cause the intermixed portions of the media to at least properly separate, and the water wash flow should be continued until the distinct layers of the bed have reformed to substantially the same extent of separation as before the start of the wash cycle.

In a specific embodiment, the filter apparatus is similar to the one described with respect to FIG. 1. It may be used as a downflow filter with the washing performed in an upflow direction, that is, the multiple-media bed will be subjected to "backwashing." Further, baffle means of the kind described with respect to FIG. 1 may be interposed in the path of the backwash water flow from the tank into the backwash water removal trough for diverting media suspended in the backwash water from exiting therewith.

It will be understood that similar procedures can be employed in connection with upflow filters in which the filtering and washing flows are in the same direction, and that other means besides baffles may be employed to divert media suspended in the wash water, such as occurs particularly in the simultaneous air-water wash, from exiting with the waste backwash water.

EXAMPLES

Returning to FIG. 1, a backwash procedure in accordance with the method of this invention. After a number of backwashings, the multiple-media filter bed will achieve a relatively fixed orientation with the higher density, and usually smaller grain size medium, such as garnet or silica sand, on the bottom, and the lower density and usually larger diameter, medium such as anthracite coal on top. As illustrated more clearly in FIG. 2A, an intermediate zone of intermixed media may occur in which the smaller sizes of the higher density media are interspersed with the larger size grains of the lower density media. The extent of intermixing depends on the relative size and density of the media layers and may be controlled by appropriate selection and gradation of each medium and by the rate and duration of backwash.

As the backwash operation is initiated, water is passed from pipe 20 through pipe 18, into plenum 17, through media retaining nozzle assemblies 15 and 16 and upward through the filter bed. Air is supplied within a few seconds of turning on the backwash water—and in fact can precede the turning on of the water—through pipe 21 and is metered into the filter bed 22 through properly-sized orifices located in the tailpipes 15 of the media-retaining nozzle assemblies.

Figure 2A:
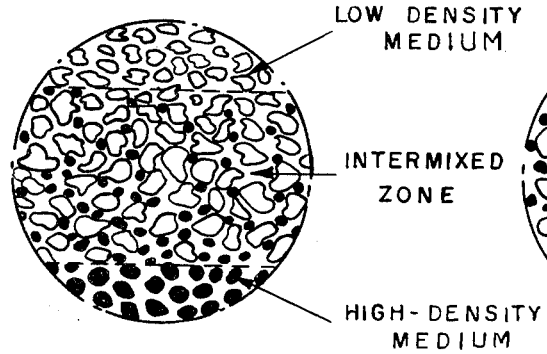
FIG. 2A is a fragmentary enlarged view of a portion of the multiple-media bed of FIG. 1 illustrating the appearance of the bed during normal filtration.
Figure 2B:
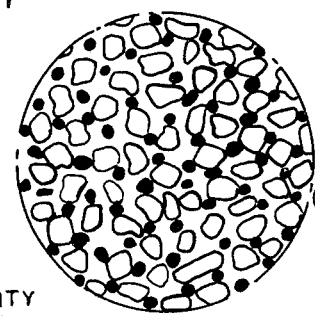
FIG. 2B is an enlarged fragmentary view of a cross-section of the multiple-media bed similar to FIG. 2A but illustrating the appearance of the bed during combined air-water backwashing.

The simultaneous passage of air and water through the multiple-media bed causes substantial mixing of the media layers except that with some combinations of media sizes and backwash rates, a predominance of the high density medium may remain in the lower levels of the bed and a predominance of the lower density medium may remain in the upper reaches of the bed. Substantially complete mixing is the preferred effect, but the method hereof is also applicable to partial intermixing of the adjacent layers, that is, the intermixing during washing, as shown in FIG. 2B, is substantially greater than during filtration, as illustrated in FIG. 2A.

As water and air flow continue simultaneously, the water begins to flow through restricted flow channels 34 and 36 located between air-water separator baffles 33 and 35 and trough 27 and over the edges 28 and 29 of the backwash water collection trough 27 carrying with it the solids washed from the filter media. This simultaneous flow of air and water is permitted to continue until the filter bed is substantially clean as determined by cleanliness of the backwash water or by timed duration or by other suitable means. In the method of this invention, the backwash water (or wash water) must flow into the wash water collector while air and water are applied simultaneously.

After the media bed is cleaned of entrapped solids, the air flow is turned off by closing valve 21a and the water flow is continued until the media bed is restratified sufficiently for subsequent filter operation. In the preferred application, the same water rate is used for restratification as is used during simultaneous air-water wash, but a higher water rate can be used to restratify the bed if required. The exact rates of air and water to be used in the method of the invention will necessarily vary for different combinations of media size and density.

Figure 3:
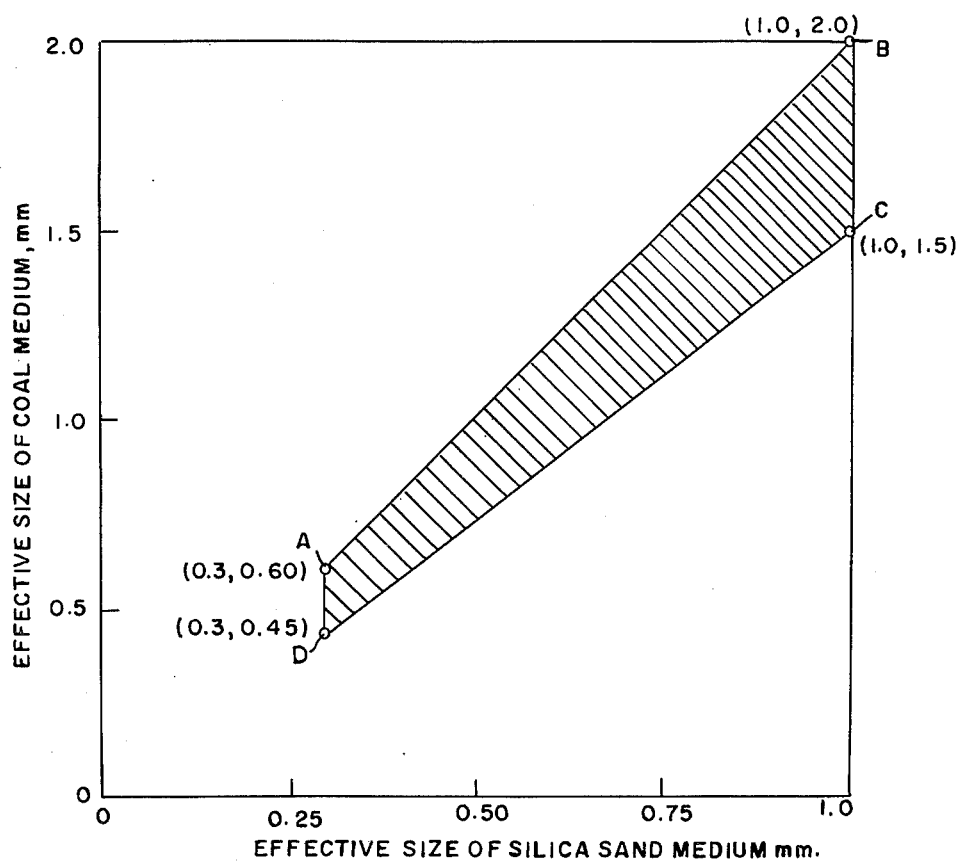
FIG. 3 is a diagram illustrating the preferred size relation between the coal medium and the silica sand medium for use as adjacent layers in a multiple-media bed.
Figure 4:
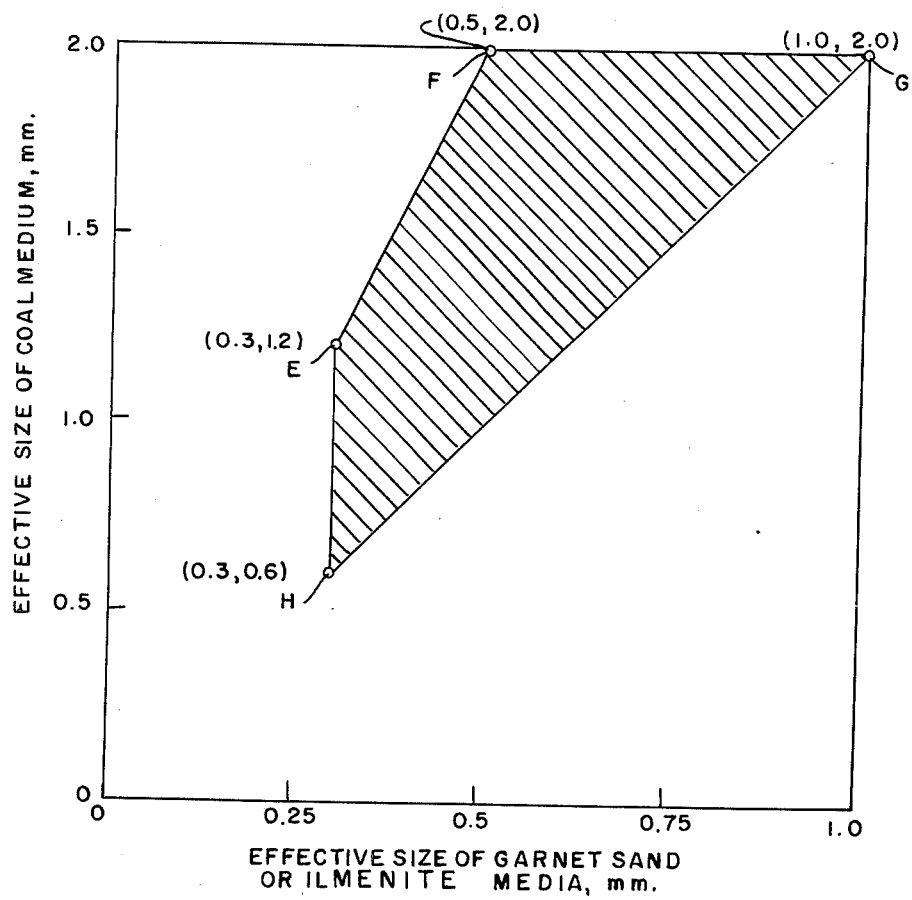
FIG. 4 is a diagram showing the preferred size relation between a coal medium and garnet sand or ilmenite medium for use as adjacent layers of multiple-media beds.

While the method of this invention as described above is not limited to specific media combinations, media sizes, or media densities, there are certain embodiments which are presently believed to be the most desirable for commercial use. Further, with respect to these media combinations, there are preferred size ratios between the adjacent media layers. These combinations and the size ratios are illustrated in FIGS. 3, 4, and 5. With reference to these figures and as used herein, the term "effective size" is defined as the media grain diameter at which 10% of the total grains by weight are smaller and 90% are larger. (ASTM Committee E-11, 1969.)

FIG. 3 illustrates the way in which useable or preferred size ratios may be determined between a coal medium used as the next stratified layer over a silica sand layer, that is, the coal is the larger particle size, lower density medium, while the silica sand is a smaller particle size, higher density medium. Such a combination may be used as the two media of a dual-media filter, or as the upper and intermediate media layers of a three-media filter, using garnet or ilmenite sand as the lowermost layer, which has the smallest size particles of highest density.

As will be noted with reference to FIG. 3, the effective size of the coal medium in millimeters (mm) is plotted on the vertical axis, while the effective size of the silica sand medium in millimeters (mm) is plotted on the horizontal axis. In this illustration the coal has a specific gravity of from 1.5 to 1.7. The shaded region enclosed by the tetrahedran A-B-C-D including the boundary line therearound represents the desirable size ratios of the coal particles to the silica sand particles. In the interest of precise illustration, the coordinates for the points A, B, C, and D are shown on the diagram. For example, point A represents a ratio of 0.67 mm coal to 0.30 mm silica sand, etc. The size ratios defined by the diagram of FIG. 3 are preferably used in a coal and silica sand dual-media bed.

FIG. 4 illustrates preferred size ratios for a dual-media bed using coal particles as the larger lower density medium over garnet or ilmenite sand as the smaller higher density medium. In this illustration, the coal has a specific gravity of from 1.5 to 1.7. The useable or preferred ratios of the coal to the garnet or ilmenite sand are defined by the region enclosed by the tetrahedran E-F-G-H including the boundary line therearound. The coordinates for the points E, F, G, and H are shown on the diagram. For example, point E represents a ratio of 1.2 mm coal to 0.3 mm garnet or ilmenite sand.

FIG. 5 illustrates the preferred ratios for a silica sand medium used over a garnet or ilmenite sand medium. These ratios may be used in a dual-media bed employing silica sand as the upper media and garnet or ilmenite sand as the lower media, or in a three-media bed using coal as the upper media, silica sand as the intermediate media, and garnet or ilmenite sand as the lowermost media. In the latter case, the effective size ratios of the uppermost coal layer to the intermediate silica sand layer will be defined by the ratios of FIG. 3.

With reference to the foregoing examples as illustrative of the method of this invention, the combined air-water backwash flow is continued for at least two minutes or more and preferably for at least five minutes. During the combined backwash, usually 25% or more of the water used for the wash cycle passes through the mixed media bed and into the water removal means. For example, from 40 to 75% of the water used for the wash cycle can be used in this manner.

While the foregoing disclosure assumes that the invention will be applied primarily to multiple-media beds where a low-density, large grain size medium overlies a high-density, small grain size medium, it will be apparent to those skilled in the filtration arts that the invention may be applied in an equivalent embodiment wherein the multiple-media bed comprises a low-density, small grain size medium over a high-density, large grain size medium.

We claim:

1. The method of washing a multiple-media filter for removal of filtered solids therefrom, said filter including a tank having a stratified multiple-media bed therein including a distinct upper layer of a medium of lower density and larger effective size and at least one distinct lower layer of a medium of higher density and smaller effective size, upflow air-water washing means permitting simultaneous washing of said bed with a mixture of air and water followed by washing with water alone, and water withdrawal means in the upper portion of said tank above said bed including means for diverting media suspended in the wash water from exiting therewith, comprising the steps in a wash cycle of:
   (a) passing a wash mixture of air and water upwardly through said bed simultaneously at air and water flow rates sufficient to cause at least partial intermixing of said distinct layers;
   (b) continuing said simultaneous air-water wash flow while simultaneously removing water from said tank by said withdrawal means;
   (c) thereafter passing wash water without said air upwardly through said bed at a rate at least as great as the rate used for said simultaneous air-water washing, said water rate being sufficient to cause said intermixed media to at least partially separate; and
   (d) continuing said water wash flow until the distinct layers of said bed have reformed to substantially the same extent of separation as before the start of said wash cycle.

2. The method of claim 1 in which said water flow rate is the same in said water wash as in said air-water wash.

3. The method of claim 1 in which said water flow rate in said water wash is greater than in said air-water wash.

4. The method of washing a multiple-media filter for removal of filtered solids therefrom, said filter including a tank having a stratified multiple-media bed therein including a distinct upper layer of a medium of lower density and larger effective particle size and at least one distinct lower layer of a medium of higher density and smaller effective particle size, upflow air-water wash means permitting simultaneous washing of said bed with a mixture of air and water followed by washing with water alone, and wash water collection trough means in the upper portion of said tank above said bed including means interposed in the path of water flow from said tank into said trough for diverting media suspended in the wash water from exiting therewith, comprising the steps in a wash cycle of:
   (a) passing a wash mixture of air and water upwardly through said bed simultaneously at air and water flow rates sufficient to cause at least partial intermixing of said distinct layers;
   (b) continuing said simultaneous air-water wash flows while simultaneously removing water from said tank by said withdrawal means and until at least 25% of the water used for the entire wash cycle has exited from said tank;
   (c) thereafter passing wash water without said air upwardly through said bed at a rate at least as great as the rate used for simultaneous air-water washing, said water rate being sufficient to cause said intermixed media to at least partially separate; and
   (d) continuing said water wash flow until the distinct layers of said bed have reformed to substantially the same extent of separation as before the start of said wash cycle.

5. The method of claim 4 in which said bed is a dual-media bed containing coal particles as the lower density medium and silica sand particles as the higher density medium.

6. The method of claim 5 in which the effective size of said coal particles has a ratio to the effective size of said silica sand particles defined by the points falling within the Region A-B-C-D of FIG. 3 including the boundary line therearound.

7. The method of claim 4 in which said bed is a dual-media bed having particles of coal as the lower density medium and particles of a higher density medium selected from the class consisting of garnet and ilmenite sand.

8. The method of claim 6 in which said particles of coal have an effective size ratio to said particles of higher density medium defined by the points falling within the Region E-F-G-H of FIG. 4 including the boundary line therearound.

9. The method of claim 4 in which said bed is a tri-media bed containing particles of coal as the upper lower density medium, particles of silica sand as an intermediate medium, and particles of a higher density medium beneath said silica sand selected from the class consisting of garnet and ilmenite sand.

10. The method of claim 9 in which said particles of coal have an effective size ratio to said particles of silica sand defined by the points falling within the Region A-B-C-D of FIG. 3 including the boundary line therearound, and said particles of silica sand have an effective size ratio to said particles of said higher density medium are defined by the points falling within the Region I-J-L-K of FIG. 5 including the boundary line therearound.

11. The method of claim 6, or claim 8, or claim 10 in which said water flow rate is the same in said water wash as in said air-water wash.

12. The method of claim 6, or claim 8, or claim 10 in which said water flow rate in said water wash is greater than in said air-water wash.

* * * * *